April 26, 1966 J. S. KAMBORIAN, JR 3,248,482

CALL ANSWERING SYSTEM

Original Filed Sept. 14, 1960 2 Sheets-Sheet 1

INVENTOR.
Jacob S. Kamborian, Jr.
BY
[signature]
ATT'YS.

April 26, 1966 J. S. KAMBORIAN, JR 3,248,482

CALL ANSWERING SYSTEM

Original Filed Sept. 14, 1960 2 Sheets-Sheet 2

INVENTOR.
Jacob S. Kamborian, Jr.
BY
Roberts, Cushman & Grover
ATT'YS.

United States Patent Office 3,248,482

Patented Apr. 26, 1966

3,248,482

CALL ANSWERING SYSTEM

Jacob S. Kamborian, Jr., Duxbury, Mass., assignor, by mesne assignments, to International Shoe Machine Corporation, Boston, Mass., a corporation of Massachusetts Continuation of application Ser. No. 55,955, Sept. 14, 1960. This application Feb. 10, 1965, Ser. No. 433,844

9 Claims. (Cl. 179—6)

This application is a continuation of pending application Serial No. 55,955 filed September 14, 1960, and now abandoned.

*The field* of the present invention is that of automatically transmitting, upon receipt of a calling signal, prerecorded information to the caller and of receiving and recording a message from the caller in response to such information; more particularly, automatic answering devices according to the invention are of the type employing elongate recording means such as magnetic tape, for carrying such information and messages.

*Objects* of the invention are to provide a system of the above general type which permits the use of standard commercial telephone receivers with a hand-set having a speaker and a microphone, without electrical connection to the telephone receiver and indeed without any change thereof or incursion whatsoever, electrical or mechanical, thereinto; to provide such a system which permits the use of commercially available comparatively inexpensive tape recording devices with a minimum of modification thereof; to provide such a system which permits the use of standard magnetic tape and the inexpensive and convenient adaptation thereof for purposes of the invention, adaptable to any desired length of pre-recorded information and received message, and suitable for repeated use of such information; to provide such a system which in no way interferes with the normal and authorized operation of the public utility or other telephone installation with which it is associated; to provide a device conforming to such a system which can be put in use simply by placing a standard telephone receiver upon it and which does not interfere with the customary manual operation of the receiver even while it remains associated with the device according to the invention; to provide such a system which is simple and nevertheless fully effective for all purposes demanded of such systems, and within reasonable limits not restricted to a certain length of pre-recorded information or to a given number of messages; and to provide such a system which, although it provides all conveniences of much more elaborate systems and is very rugged and fully reliable, is comparatively inexpensive and does not require any cost of installation so that it can be made available to a much larger population than was heretofore able to take advantage of systems of this type.

*The substance* of the invention can be briefly summarized, and characterized in some of its aspects, as follows:

The invention is concerned with an information sending and message recording device adapted for use with a conventional telephone reeceiver and incorporating components of a conventional strip recorder having provisions for changing its operation from recording to play-back with its record strip running in one direction, and for further changing the operation from recording and play-back operation to rewinding operation. Devices according to the invention comprise, in one of its principal aspects detector means which are responsive to call signals emitted by the telephone receiver and which initiates the operation of a relay device; readying means actuated by the call signal responsive means for putting the conventional telephone receiver into operative condition; sending control means responsive to the relay device for placing the conventional strip recorder components into play-back condition for purposes of sending pre-recorded information to the calling party; and operation control means at the end of the information section of, and moving synchronously with the recorder strip for conditioning the recorder to receive a message which the calling party might wish to leave.

In a further important aspect of the invention, the system also comprises means for terminating the recordation of the received message and for conditioning the device for again dispatching to a caller information previously imparted thereto.

The above-mentioned call signal responsive means preferably includes an acoustic pickup which, with or without appropriate delay, effects energization of an electromechanical device for lifting the hand set of a telephone receiver placed on the device according to the invention, thus putting the hand set into normal operative condition. The means for placing the magnetic recorder into information dispatching condition, in response to the call signal responsive means, preferably incorporates switch means operated by the hand set lifting device.

In another practically important aspect of the invention, pre-recorded information as well as messages responsive thereto are contained or received on consecutive portion of a recording strip such as a magnetic tape carrying operation control means, such as electrically, mechanically, or optically effective marks or indicia, applied to the strip between information and message carrying sections. In an embodiment which is particularly characteristic of the present invention, the operation control means which moves synchronously with the record strip comprises conductive portions placed on the record without in any way impeding its operation, such as patches of metallic paint which electrically initiate the operation of relay means for changing the condition of the tape recorder from play-back to recording, making it ready to receive a message from the calling party, while the telephone hand set is maintained in lifted, operative position.

These and other objects and inventive aspects of the invention will appear from the herein presented outline of its mode of operation and its practical possibilities together with a detailed description of a practical embodiment illustrating its novel characteristics.

*The description* refers to drawings in which

Figures 1, 5, 6:
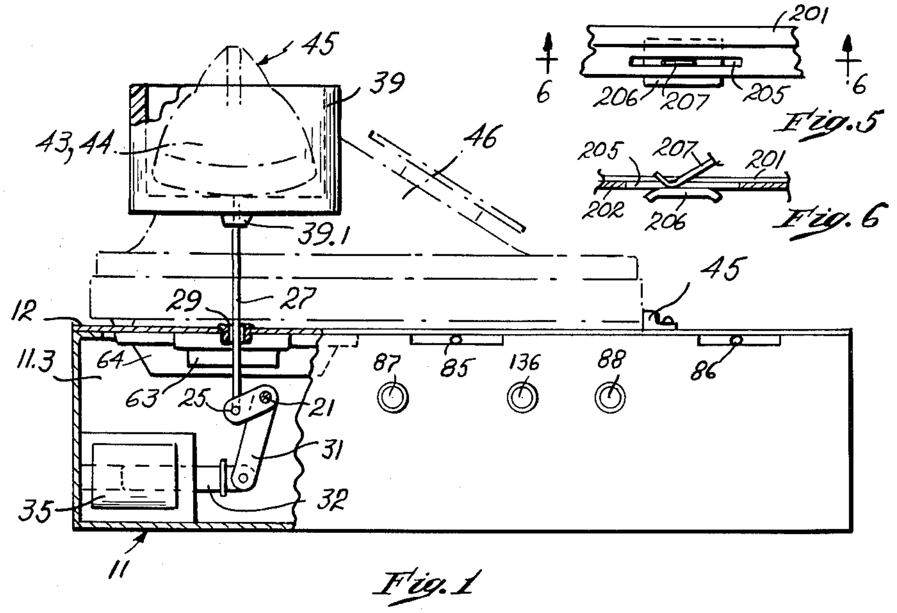
FIG. 1 is a front elevation, with part of the housing broken away, of a device according to the invention.
FIGS. 5 and 6 are diagrammatic views of operation control means according to other embodiments of the invention, FIG. 6 being a section on lines 6—6 of FIGURE 5.
Figure 2:
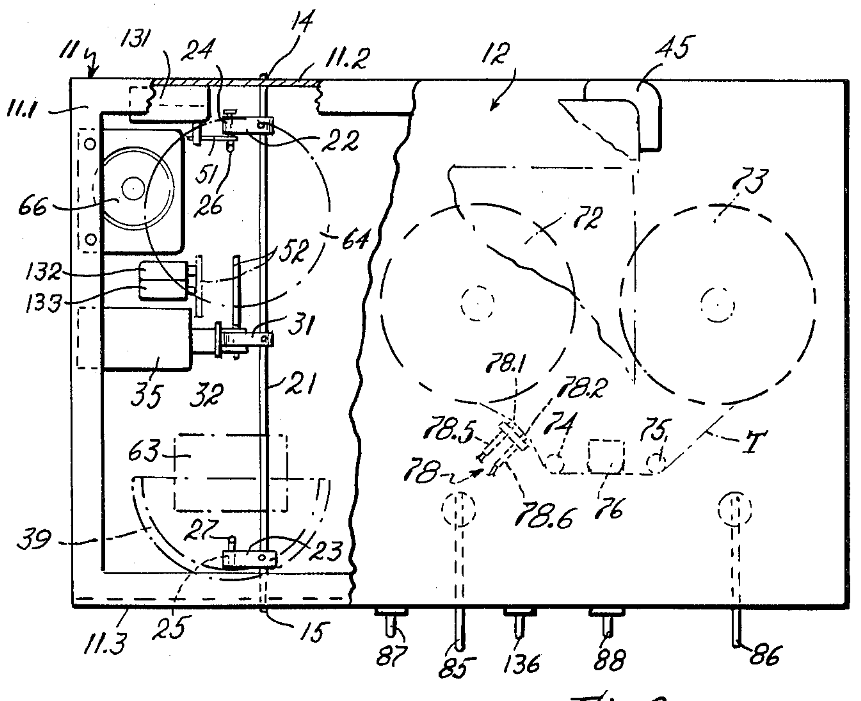
FIG. 2 is a top elevation of the device with part of the housing cover broken away.

In FIGS. 1 and 2, numeral 11 designates a housing made from suitably strong material, in the present embodiment sheet metal. The housing has a crimped flange 11.1 to which is screwed a lid 12. Pivoted in the side walls 11.2, 11.3 of the housing, at 14 and 15, is a shaft 21 extending throughout the width of the housing. Two swivel arms 22 and 23 are rotated clockwise with reference to the shaft near the side walls of the housing. At their ends the swivel arms are perforated to receive the bent end portions 25 of two lifting rods 26, 27 which are slidingly supported by the housing cover, such as indicated at 29 of FIG. 1. Fastened to the shaft 21 approximately at its middle, is a third swivel arm 31 which is connected to the armature 32 of a lifting motor, such as solenoid 35. Fastened to the outer ends of the rods 26 and 27 are fastened two cradles 38 and 39, respectively, are essentially semicircularly cylindrical, with semicircular bottoms, and dimensioned to receive the speaker 43 and microphone 44, respectively, of the hand set 45 of a telephone receiver. These cradles can be made of suitable material such as synthetic plastic, and with bosses 39.1 joined to the lifting rods 26 and 27. The conventional telephone receiver is indicated in dot and dash line at 46. It will be evident that attraction of the armature 32 by the solenoid 35 will rotate the shaft 21 such that the arms 22 and 23 are rotated clockwise with reference to FIG. 1, lifting the rods 26 and 27 and with them the cradle 38, 39 and with it the hand set of the telephone receiver. The lid 12 of the housing can be provided with means for locating and securing the hand set 42, such as a rim 45 as shown in FIG. 1.

As indicated in FIG. 2, the swivel arm 22 is provided with a link 51 for the purpose of actuating a switch 131, the function of which will be explained below. The armature linking pin 52 is extended for the purpose of operating two switches 132 and 133, preferably of the microswitch type. As indicated in dot and dash lines in FIG. 2, the pin 52 is in operative position when the armature 32 is attracted and the hand set in lifted position.

FIGS. 1 and 2 further indicate, in juxtaposition to the telephone hand set microphone 44, a recorder speaker 64, and in juxtaposition to the telephone hand set speaker 43 a recorder microphone 63; these are preferably fastened to perforated regions of the housing lid 12. Fastened to the flange 11.1 and juxtaposed to the signal bell of the telephone receiver is an acoustic call detector 66.

Figure 3:
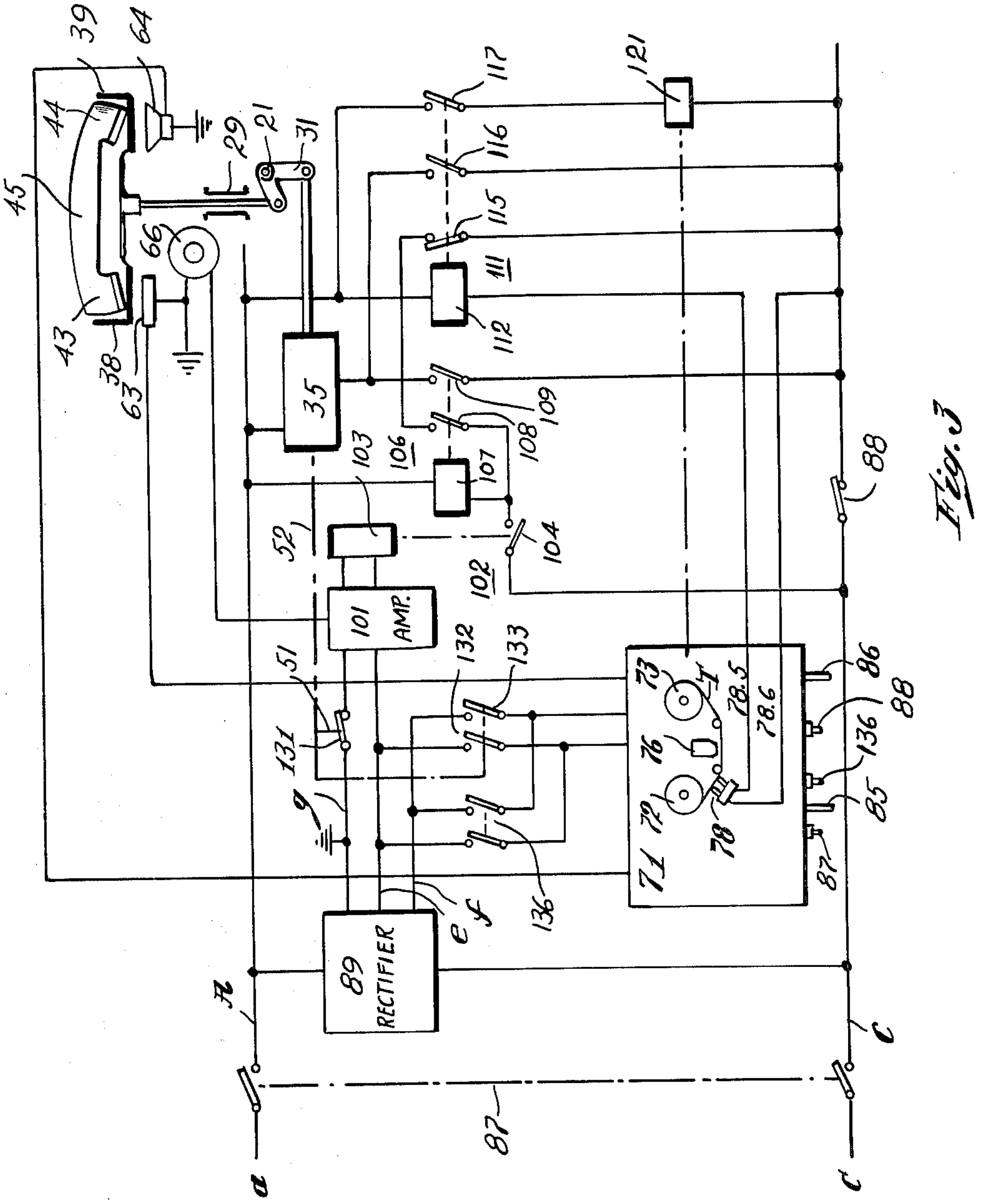
FIG. 3 is a schematical circuit and mechanical diagram of the device according to the invention.

FIG. 2 also indicates the conventional tape reels of the tape recorder indicated at 71 of FIG. 3 such as storage reel 72 and receiving reel 73. Further indicated are tape guide rolls 74 and 75, a conventional sound detecting and recording head 76. An operation control switch according to the invention is indicated at 78, having switch springs 78.1 and 78.2 and appropriate electrical lead wire connections 78.5, 78.6. A magnetic tape T, adapted for present purposes in the manner to be described below, is threaded into the recorder in conventional manner, but with springs 78.1, 78.2 sliding on the outer side of the insulating base or carrier of the tape.

Further indicated in FIGS. 1 and 2 are three toggle switches 87, 88 and 136, and two control levers 85, 86 which are associated with conventional control components of the tape recorder as will be explained hereinbelow.

FIG. 3 shows the above dscribed mechanical components schematically, in correlation with the electric components, as follows.

The structure for lifting the telephone hand set 45 by way of the solenoid 35, the shaft 21 and the cradle 38, 39 will be readily recognized in FIG. 3 and correlated with FIGS. 1 and 2. Similarly, the tape recorder indicated by block 71 in FIG. 3 will be recognized as incorporating the above described components which are similarly numbered in these figures.

The device as a whole can be connected to a conventional current supply system marked A.C., for example a standard 115 volt wall outlet leading through a double pole main switch 87 to two main buses A, C. A normally closed cut-out switch 88 is contained in bus C for a purpose to be explained below. A conventional rectifier device 89 is connected across the buses A and C, constructed and arranged to provide two different operating voltages as indicated by rectifier output terminals *e*, *f* and ground *g*.

The above mentioned acoustic call detector 66 is part of a call relay device including an amplifier of conventional construction marked 101 which receives its energy from lead *e* and the control input terminal of which is connected to the detector 66, which can be a microphone or other sound responsive transducer. The output of amplifier 101 is fed into a magnet relay 102 with solenoid 103 and normally open switch 104. The switch 104 is adapted to energize a relay 106 with solenoid 107 and two normally open switches 108 and 109. The operation control switch 78 with contacts 78.1, 78.2 which can be spring contacts of conventional design, are normally electrically separated by the insulating base of strip T. Thus they normally open the supply line of a latching relay 111 wtih solenoid 112, normally closed switch 115 and normally open switches 116 and 117. The latching relay 111 is of conventional design and so constructed and arranged that it will transfer the switches upon receiving an energy impulse and again transfer them back into the normal position upon receiving a consecutive energy impulse. Switches 115 and 116 are holding switches for purposes to be described hereinbelow, and switch 117 serves to energize a solenoid 121 for operating the conventional recorder component which changes its condition from play-back to recording, as indicated by the mechanical connection leading in FIG. 3 from the solenoid 121 to the recorder unit 71. It will be understood that the components of the conventional recorder units 71 can be dismounted and redistributed within the housing 11, in any manner desired and convenient, and depending upon the construction of the tape recorder preferably purchased in the open market.

The normally open switch 109 of relay 106 energizes when closed the lifter solenoid 35 which in turn operates the above described cradle mechanism, lifting the hand set 45 from its conventional supports on the telephone receiver.

As described above, the call responsive acoustical detector 66 is arranged opposite the signal bell of the telephone receiver, the conventional recorder microphone 63 is arranged opposite the telephone speaker 43, and the conventional tape recorder speaker 64 is arranged near the telephone microphone 44 of the hand set 45, as clearly indicated in FIG. 3. The connections of microphone 63 and speaker 64 into the recorder 71 are conventional.

A normally closed switch 131 in the power supply lead *g* from the rectifier 89 to the amplifier 101, and a set of normally open switches 132 and 133 are mechanically connected to the lifter solenoid 35 by links 51 and 52 as above described with reference to FIGS. 1 and 2. A hand operated double throw, double pole switch 136 is provided for bridging the above described lifter operated switches 132 and 133 which are arranged to supply energy to the recorder unit 71. The conventional recorder controls for changing the setting from forward (recording and play-back) to rewinding, and its volume control, indicated at 85 and 86 of FIGS. 1 and 2, are similarly indicated in FIG. 3. The manual controls for switches 87, 88 and 136 are likewise indicated on the block 71 indicating the recorder unit and it will be understood that the switches themselves are shown in the circuit diagram proper.

Figure 4:
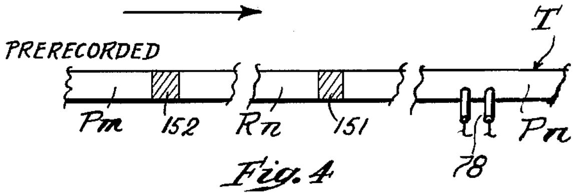
FIG. 4 is a diagrammatic view of a magnetic recording tape prepared for purposes of the present invention.

FIG. 4 shows by way of example a magnetic recording tape according to the invention which is preferably used for purposes of the above described embodiment. In this figure, the tape is shown in three sections, a blank or message receiving or former message carrying section $R_n$ between two information sections $P_m$, $P_n$ carrying the pre-recorded dispatch to the caller. Conductive patches, such as of conventional silver paint, indicated at 151, 152, separate the pre-recorded information sections from the blank or recorded message sections. The operation control contacts 78 are also indicated in FIG. 4. It should be noted that, depending on the condition of the device, the sections such as $R_n$ can be blank, or carry a previously recorded message ready to be played back or to be replaced by new message.

The above described embodiment of the present invention operates as follows.

The tape recorder, in play-back condition provided by its conventional controls, is loaded with an empty reel 73 and with a loaded reel 72 carrying message receiving sections separated from information sections by control marks such as the above described pads of metallic paint. Assuming that the device as a whole is in condition ready for operation as indicated in FIG. 3, with an information section at the beginning of the tape, it will be made completely operative by closing the switch 87.

If a telephone call comes in, the telephone bell signal will actuate the call detector, here the sound pressure sensitive device or microphone 66. The output signal of 66 is amplified at 101 which is supplied with energy by the rectifier 89 through the normally closed switch 131. The amplifier output energy energizes the solenoid 103 of relay 102 which closes switch 104 thus energizing solenoid 107 of relay 106, closing switches 108 and 109. Switch 108 establishes a holding circuit for solenoid 107 and switch 109 energizes the lifting solenoid 35. The energization of 35 lifts the hand set 32 as above described and, through the mechanical connection 51, 52 opens switch 131 and closes switches 132 and 133. The opening of switch 131, cutting off the energy supplied to the amplifier 101 and the solenoid 103 does not de-energize solenoid 107 because of the holding circuit through the closed switches 108 and 115. The closing of switches 132 and 133 starts the recorder motor and amplifier and the tape T begins to run, playing back the pre-recorded message on section $P_n$ as indicated in FIG. 4, through the speaker 64 which as above described is juxtaposed to the telephone microphone 44.

At the end of the pre-recorded information section $P_n$ is located the control patch 151 which, after the pre-recorded information has been dispatched, closes a circuit at contacts 78, thus sending an energy impulse into the latching solenoid 112 which transfers switch 115 to open position and switches 116 and 117 to closed positions and retains these positions until another impulse is applied. With switches 115 and 104 open, the solenoid 107 is de-energized so that switches 108 and 109 of relay 106 open. The closed switch 116 keeps the lifter solenoid 35 energized although switch 109 is now open. The now closed switch 117 puts the recorder conditioning solenoid 121 into operative condition thus changing the recorder setting from play-back to recording.

With the recorder motor and the tape still running, and the amplifier 101 remaining de-energized, the tape section $R_n$ now records the incoming message until the tape contacts 78, previously opened upon leaving patch 151, are again connected through patch 152 and send an energy pulse through the latching solenoid 112 which now restores in conventional manner its three switches to normal position, namely switch 115 to closed and switches 116 and 117 to open positions as shown in FIG. 3. The opening of switch 117 de-energizes solenoid 121 and restores the recorder to play-back condition. The opening of switch 116, with switch 109 open, de-energizes the lifter solenoid 35 which lowers the hand set 45 into inoperative position and by way of mechanical operators 51 and 52 closes switch 131 and opens switches 132 and 133. It will be noted that switch 115 is now back in normally closed position which, with switch 108 being open as above described, puts this part of the device back into normal call signal awaiting position. Switches 132 and 133 having been opened by way of the de-energization of lifting solenoid 35, and switch 131 being now closed, the recorder is disconnected but the amplifier for the sound relay 66 is reinserted. Thus, the device is now in the initially described condition ready to respond to another incoming call signal.

It will be noted that it is irrelevant whether or not a previous message is recorded on tape section $R_n$, since the recording of an incoming message automatically erases the previous record.

For listening to the recorded message from the caller, the double pole switch 136 is closed by hand in order to bypass the automatically controlled and now open switches 132 and 133, thus putting the recorder into operative condition. Switch 88 also is opened in order to disconnect the patch controlled contacts 78 so that, for listening to messages $R_n$, the latching relay 111 will not be activated. With switch 136 closed and 88 open, the motor can be reversed and the tape rewound by means of the above described control 85. The recorded message can now be listened to from the section $R_n$ of the tape T. After listening to the message, the recorder can be stopped upon encountering a short warning message which may conveniently be put on the tape at the beginning of any pre-recorded message $P_m$, $P_n$. Upon resetting the recorder with controls 85, 88 and 136, the device is again in condition for receiving another call signal and for repeating the above described cycle. It will be noted that in FIG. 3, the manual controls of switches 87, 88, 136 are indicated on the recorder block 71, together with the rewind control 85 and the volume control 86.

In a fully operative practical embodiment a ¼" standard magnetic tape on an acetate base was used, with patches about ⅝" long consisting of silver paint obtained from General Cement Manufacturing Company of Rockford, Illinois; the distance of the contacts 78.1, 78.2 was about ¼" for this patch. The pre-recorded information sections $P_n$ as well as the message portions $R_n$ were about 5 to 6 feet long which, with a tape speed of 3.75 inches per second was found to provide sufficient time for both purposes, so that about 18 sets of information and message sections could be put on a 150 foot tape reel.

If the telephone receiver should be equipped with an optical signal means, such as a lamp, instead of a bell, the above described acoustic call signal responsive means 66 can be replaced by a conventional photoelectric detector juxtaposed to the signal lamp and controlling, through an amplifier similar to component 101, the relay 103 as above described.

Instead of using the above described magnetic tape with operation control patches directly establishing an electrical connection between feeler contacts, recording and control strips of the type shown in FIGS. 5 and 6 can be used. These figures also illustrate the possibility of using separate, synchronously progressing recording and control members.

In these figures, a magnetic tape 201 of conventional construction rests on and, if desirable is removably fastened such as by means of a separable adhesive, to a backing strip 202 made for example of conventional acetate motion picture film material. This backing strip is slotted as indicated at 205, at points corresponding to those where the above described metallic patches 151, 152 are applied to the magnetic tape T. At the free side of the backing strip is arranged a stationary contact pad 206, and on the other side a stationary spring contact 207 which is narrower than the slots 205. The backing carrying the tape normally separates the two contacts whereas, when one of the slots is reached, contact is established for effecting the above described operational control. If the slots 205 are extended over the entire length of each message receiving section corresponding to $R_m$ of FIG. 4, the latching action of relay 111 can be dispensed with, as will now be readily understood; instead of depending on a second current impulse derived from patch 152, the magnet 112 will be kept energized by the direct contact through the long slots.

Slot arrangements, or slightly protruding portions, on backings or directly on tapes can also be used, to operate highly sensitive feeler elements of microswitches serving for making connection between contacts corresponding to the above described contacts 78.

Instead of using directly contact making and breaking devices for operational control purposes within devices according to the invention, capacitively or inductively effective operational marks can be used for generating electrical control impulses, and photoelectrically or acoustically effective marks can be used for indirectly generating these impulses.

It should be understood that the present disclosure is for the purpose of illustration only and that this invention includes all modifications and equivalents which fall within the scope of the appended claims.

I claim:

1. A device for dispatching pre-recorded information and for recording a message responsive thereto, adapted for use with a conventional telephone receiver having a base and a hand set, said device employing a strip means having spaced control marks thereon with information transmitting sections extending between certain of said control marks and message receiving sections extending between others of said control marks, comprising. a sound recorder so constructed as to be in a playback condition, wherein sound may be transmitted from said information transmitting sections, or in a recording condition, wherein sound may be recorded on said message receiving sections; moving means actuable to move the strip means through the recorder in a predetermined path; change-over means positioned alongside said path and actuable in response to the presentation of a control mark thereto to place the recorder in either recording or play-back condition; detector means actuable in response to the call signal of said telephone receiver; readying means operative in response to actuation of said detector means for putting said telephone receiver into operative position by separating said base and said hand set; sending control means actuable in response to operation of said readying means for actuating said moving means to move an information transmitting section through the recorder in said path with the recorder in play-back condition whereby sound is transmitted from said information transmitting section by way of the recorder into the telephone receiver; means responsive to the presentation of the control mark at the end of said information transmitting section to the change-over means to actuate the change-over means to cause the recorder to be placed in recording condition whereby sound transmitted into the recorder from the telephone receiver is recorded on a message receiving section moving through the recorder; and means responsive to the presentation of the control mark at the end of said message receiving section to the change-over means to bring the base and hand set together and to terminate the actuation of said moving means.

2. The device as defined in claim 1 further comprising: means responsive to the presentation of the control mark at the end of said message receiving section to the change-over means to actuate the change-over means to cause the recorder to be placed in play-back condition.

3. A device for dispatching pre-recorded information and for recording a message responsive thereto, adapted for use with a conventional telephone receiver having a base and a hand set and acoustic call signal means, said device employing a strip means having spaced control marks thereon with information transmitting sections extending between certain of said control marks and message receiving sections extending between others of said control marks, comprising: a sound recorder so constructed as to be in a play-back condition, wherein sound may be transmitted from said information transmitting sections, or in a recording condition, wherein sound may be recorded on said message receiving sections; moving means actuable to move the strip means through the recorder in a predetermined path; change-over means positioned alongside said path and actuable in response to the presentation of a control mark thereto to place the recorder in either recording or play-back condition; air pressure sensitive detector means juxtaposed to and actuable in response to the call signal means of said telephone receiver; a movable support for said hand set; readying means including magnetic motor means operative in response to actuation of said detector means for putting said telephone receiver into operative position by lifting said support and thereby lifting said hand set; sending control means including magnetic relay means actuable in response to operation of said readying means for actuating said moving means to move an information transmitting section through the recorder in said path with the recorder in play-back condition whereby sound is transmitted from said information transmitting section by way of the recorder into the telephone receiver; means responsive to the presentation of the control mark at the end of said information transmitting section to the change-over means to actuate the change-over means to cause the recorder to be placed in recording condition whereby sound transmitted into the recorder from the telephone receiver is recorded on a message receiving section moving through the recorder; and means responsive to the presentation of the control mark at the end of said message receiving section to the change-over means to lower the movable support and thereby lower the hand set onto the base and to terminate the actuation of said moving means.

4. The device as defined in claim 3 further comprising: means responsive to the presentation of the control mark at the end of said message receiving section to the change-over means to actuate the change-over means to cause the recorder to be placed in play-back condition.

5. A device for dispatching pre-recorded information and for recording a message responsive thereto, adapted for use with a conventional telephone receiver having a base and a hand set, said device employing a strip having spaced identical control marks thereon with information transmitting sections extending between certain of said control marks and alternating with message receiving sections extending between others of said control marks, comprising: a sound recorder having components constructed as to be in a play-back condition, wherein sound may be transmitted from said information transmitting sections, or in a recording condition, wherein sound may be recorded on said message receiving sections; moving means actuable to move the strip through the recorder in a predetermined path; change-over means positioned alongside said path and actuable in response to the presentation of a control mark thereto to place the recorder in either recording or play-back condition; detector means actuable in response to the call signal of said telephone receiver; readying means operative in response to actuation of said detector means for putting said telephone receiver into operative position by separating said base and said hand set; sending control means actuable in response to operation of said readying means for actuating said moving means to move an information transmitting section of said strip through the recorder in said path with the recorder components in play-back condition whereby sound is transmitted from said information transmitting section by way of the recorder components into the telephone receiver; means responsive to the presentation of the control mark at the end of said information transmitting section to the change-over means to actuate the change-over means to cause the recorder component to be placed in recording condition whereby sound transmitted into the recorder from the telephone receiver is recorded on a message receiving section moving through the recorder; and means responsive to the presentation of the control mark at the end of said message receiving section to the change-over means to bring the base and hand set together, to actuate the change-over means to cause the recorder components to be placed in play-back condition and to terminate the actuation of said moving means.

6. A device for dispatching pre-recorded information and for recording a message responsive thereto, adapted for use with a conventional telephone receiver having a base and a hand set and acoustic call signal means, said device employing a strip having spaced identical conductive control marks thereon with information transmitting sections extending between certain of said control marks and alternating with message receiving sections extending between others of said control marks, comprising: a sound recorder apparatus so constructed as to be in a play-back condition, wherein sound may be transmitted from said information transmitting sections, or in a recording condition, wherein sound may be recorded on said message receiving sections; electrical transferring means energizable to transfer the recorder apparatus from each of said conditions to the other of said conditions; moving means actuable to move the strip through the recorder apparatus in a predetermined path; change-over means, positioned alongside said path, adapted to energize the transferring means, and actuable in response to the presentation of a control mark thereto; air pressure sensitive detector means juxtaposed to and actuable in response to the call signal means of said telephone receiver; a movable support for said hand set; readying means including magnetic motor means operative in response to actuation of said detector means for putting said telephone receiver into operative position by lifting said support and thereby lifting said hand set; sending control means including magnetic relay means actuable in response to operation of said readying means for actuating said moving means to move an information transmitting section of said strip through the recorder apparatus in said path with the recorder apparatus in play-back condition whereby sound is transmitted from said information transmitting section by way of the recorder apparatus into the telephone receiver; means responsive to the presentation of the control mark at the end of said information transmitting section to the change-over means to actuate the change-over means to energize the transferring means to cause the recorder apparatus to be placed in recording condition whereby sound transmitted into the recorder apparatus from the telephone receiver is recorded on a message receiving section moving through the recorder apparatus; and means responsive to the presentation of the control mark at the end of said message receiving section to the change-over means to lower the movable support and thereby lower the hand set onto the base, to terminate the actuation of said moving means and to actuate the change-over means to energize the transferring means to cause the recorder apparatus to be placed in play-back condition.

7. An automatic telephone answering device, adapted for use with a conventional telephone receiver having a base and a hand set and call signal means, said device employing a magnetic recording tape having spaced identical magnetic patches longitudinally spaced thereon with information transmitting sections extending between certain of said patches and alternating with message receiving sections extending between others of said patches, comprising: a magnetic tape recorder apparatus that includes motor means, tape reel means reversibly driven by said motor means, a magnetic sound detecting and recording head, a speaker capable of being actuated by said head for sound reproduction so that the recorder apparatus is in play-back condition and a microphone capable of actuating said head for sound recording so that the recorder apparatus is in recording condition; change-over means including operation control contacts, adapted to slide on the tape advancing past said head, and actuable to transfer the recorder apparatus from each of said conditions to the other of said conditions; means for liftably supporting said hand set on the telephone receiver; means for initially placing the recorder apparatus in a play-back condition; call signal detector means juxtaposed to and actuable in response to the call signal means of said telephone receiver; electrically energized readying means operative in response to actuation of said detector means for putting said telephone receiver into operative position by lifting said hand set; sending control means actuable in response to operation of said readying means to energize said motor means to drive the reel means to advance the tape through the recorder so that an information transmitting section moves past the head whereby sound is transmitted from said information transmitting section by way of the speaker into the telephone receiver; means responsive to the bridging by the contacts of the patch at the end of said information transmitting section to actuate the change-over means to cause the recorder apparatus to be placed in recording condition whereby sound transmitted to the microphone from the telephone receiver is recorded on a message receiving section moving past the head; means responsive to the bridging by the contacts of the patch at the end of said message receiving section to lower the hand set, to actuate the change-over means to cause the recorder apparatus to be placed in play-back condition and to deenergize said motor means and thereby terminate the advance of the tape; and means for inactivating said change-over means including the operational control contacts to permit the motor means to be energized to move the tape rearwardly through the recorder apparatus and thereby rewind the tape without interference from said patches so that a recorded message may be played back.

8. The device according to claim 1 further comprising: a housing including a cover having a portion providing firm support for the telephone receiver; an actuating shaft rotatably mounted within said housing substantially parallel to said hand set adjacent to said support portion of the cover; hand set cradle means extending below and essentially in the direction of said hand set and normally retaining the hand set at rest; linkage means between said shaft and the ends of said cradle means for lifting the hand set upon rotation of said shaft; and motor means, incorporated in said readying means, linked to said shaft for rotating it.

9. The device according to claim 1 further comprising: a housing including a cover having a portion providing firm support for the telephone receiver; an actuating shaft rotatably mounted within said housing substantially parallel to said hand set adjacent to said support portion of the cover; hand set cradle means extending below and essentially in the direction of said hand set and normally retaining the hand set at rest; linkage means between said shaft and the ends of said cradle means for lifting the hand set upon rotation of said shaft; motor means, incorporated in said readying means, linked to said shaft for rotating it; switch means, incorporated in said sending control means, mounted within said housing; and mechanical means associated with said shaft for actuating said switch means, and thereby actuating the sending control means, upon rotation of the shaft.

References Cited by the Examiner

UNITED STATES PATENTS

| | | | |
|---|---|---|---|
| 2,597,957 | 5/1952 | Sepelak | 179—6 |
| 2,908,771 | 10/1959 | Gallina | 179—100.2 |

OTHER REFERENCES

H. G. M. Spratt: Wireless World, "Simple Telephone Answering," July 1956, pages 334–346.

IRVING L. SRAGOW, *Primary Examiner.*

A. I. NEUSTADT, *Assistant Examiner.*